United States Patent
Pfeil et al.

(10) Patent No.: US 9,033,565 B2
(45) Date of Patent: May 19, 2015

(54) LIGHTING DEVICE

(71) Applicant: Audi AG, Ingolstadt (DE)

(72) Inventors: Marcus Pfeil, Feucht (DE); Johannes Tovar, Ingolstadt (DE); Jürgen Maurer, Ingolstadt (DE); Richard Mohos, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 55 days.

(21) Appl. No.: 13/833,273

(22) Filed: Mar. 15, 2013

(65) Prior Publication Data

US 2013/0242603 A1    Sep. 19, 2013

(30) Foreign Application Priority Data

Mar. 16, 2012 (DE) .................... 10 2012 005 398

(51) Int. Cl.
| | |
|---|---|
| *F21S 8/10* | (2006.01) |
| *F21V 8/00* | (2006.01) |
| *B60Q 3/00* | (2006.01) |
| *B60Q 3/02* | (2006.01) |

(52) U.S. Cl.
CPC .............. *G02B 6/0035* (2013.01); *B60Q 3/004* (2013.01); *B60Q 3/0289* (2013.01); *F21S 48/00* (2013.01)

(58) Field of Classification Search
CPC ..................................................... F21S 48/00
USPC .......... 362/551, 555, 616, 606, 459, 487, 488
See application file for complete search history.

(56) References Cited

U.S. PATENT DOCUMENTS

| | | | |
|---|---|---|---|
| 6,272,265 B1 * | 8/2001 | Franklin .................... | 385/31 |
| 6,450,678 B1 * | 9/2002 | Bayersdorfer ............. | 362/581 |
| 6,869,202 B2 * | 3/2005 | Tufte .......................... | 362/224 |
| 7,134,773 B2 * | 11/2006 | Tufte .......................... | 362/505 |
| 7,512,300 B2 * | 3/2009 | Robertson et al. .......... | 385/101 |
| 7,748,882 B2 * | 7/2010 | Inditsky ...................... | 362/551 |
| 7,926,995 B2 * | 4/2011 | Forrester et al. ............ | 362/558 |
| 8,033,705 B2 * | 10/2011 | Forrester et al. ............ | 362/558 |
| 8,215,810 B2 * | 7/2012 | Welch et al. ................ | 362/488 |
| 2005/0213342 A1 | 9/2005 | Tufte | |
| 2013/0016525 A1 | 1/2013 | Metzech et al. | |

FOREIGN PATENT DOCUMENTS

| | | |
|---|---|---|
| DE | 297 17 698 | 1/1998 |
| DE | 199 21 968 | 11/2000 |
| DE | 101 35 478 | 4/2003 |
| DE | 102010006915 | 9/2011 |
| DE | 102010030660 | 12/2011 |

* cited by examiner

*Primary Examiner* — Anabel Ton
(74) *Attorney, Agent, or Firm* — Henry M. Feiereisen, LLC

(57) ABSTRACT

A lighting device includes a housing having first and second housing parts to define a first receiving space there between, and a third housing part arranged on the second housing part to define an open gap. The third housing part defines with the second housing part a second receiving space in which a first light conductor is arranged. A plastic film strip is arranged between edges of the first and second housing parts and is transparent for light emitted by the first light conductor, with the emitted light being projected into one end face of the film strip and extracted from another end face of the film strip. The film strip is sized to terminate flush with the first and second housing parts. Arranged in the second receiving space is a second light conductor which emits light through the gap.

20 Claims, 1 Drawing Sheet

LIGHTING DEVICE

CROSS-REFERENCES TO RELATED APPLICATIONS

This application claims the priority of German Patent Application, Serial No. 10 2012 005 398.3, filed Mar. 16, 2012, pursuant to 35 U.S.C. 119(a)-(d), the content of which is incorporated herein by reference in its entirety as if fully set forth herein.

BACKGROUND OF THE INVENTION

The present invention relates, in general, to a lighting device, and more particularly to a combined contour and ambient lighting device for a motor vehicle.

The following discussion of related art is provided to assist the reader in understanding the advantages of the invention, and is not to be construed as an admission that this related art is prior art to this invention.

Lighting devices come in various types and shapes to illuminate a space or to identify or highlight certain articles or objects. These lighting devices are oftentimes referred to as contour lighting as they accent the shape and contour of an object being highlighted. Contour lightings find applications in equipments or machines and also in motor vehicles. In particular, when used in motor vehicles, contour lightings find applications for speakers, buttons, control panels, cup holders etc. These types of lighting devices are in fact lighting strips which highlight certain contours. Such contour lightings are typically line lights that are realized by a light conductor which tracks the contour being highlighted. The light conductor is directly visible or installed behind a diffuser disk. Light is projected into one end face of the light conductor and exits to the side along the light conductor so that a linear light strip becomes visible.

To avoid an adverse impact on the properties of such a light-conducting element, such as a light conductor, such an element requires a cross sectional area of at least about 7 $mm^2$, whereby a height/width or diameter should not be less than 2.5 mm. Parameters that limit the use of diffuser disks include production and integration in the available installation space. For that reason, conventional contour lightings have a significant width, i.e. the bright light strip is fairly broad, i.e. typically about 2.5 mm or more. Such a broad light strip is however in some cases undesired for optical reasons as the object to be highlighted is fairly small so that such a broad light strip would virtually be overdimensioned, or for structural reasons because it may not be possible to install such a broad light strip.

Ambient lighting also finds oftentimes application in motor vehicles to illuminate a room. For that purpose separate lighting devices are installed.

It would be desirable and advantageous to provide an improved multi-functional lighting device to obviate prior art shortcomings.

SUMMARY OF THE INVENTION

According to one aspect of the present invention, a lighting device includes a housing having first and second housing parts to define a first receiving space there between, and a third housing part arranged on the second housing part such as to define an open gap, the third housing part defining with the second housing part a second receiving space, a first light conductor arranged in the first receiving space, a plastic film strip arranged between edges of the first and second housing parts and being transparent for light emitted by the first light conductor, with the emitted light being projected into one end face of the film strip and extracted from another end face of the film strip, the film strip being sized to terminate flush with the first and second housing parts, and a second light conductor arranged in the second receiving space and emitting light through the gap.

The present invention resolves prior art problems by providing a three-part housing which in order to generate a line light is elongated and of such a shape to correspond to the contour to be emulated and the contour to be framed by the generated light line. The first receiving space of the housing accommodates the first light conductor, with light being projected into this light conductor on one end and being extracted to the side. Disposed in parallel relationship to the first light conductor is the plastic film strip which is held between the edges of the first and second housing parts and terminates flush with these housing parts. The plastic film strip is transparent for light being emitted from the first light conductor. As the film strip extends parallel to this light conductor, emitted light from the light conductor is thus projected into a narrow end face of the film strip. Light exits from the other narrow end face which is flush-mounted between the narrow marginal regions of the first and second housing parts. This narrow end face thus forms the sole light emitting zone that defines the light strip. The thickness of the film strip can be made significantly smaller than the light conductor diameter so that realization of a much narrower light strip is possible. As a result, the contour lighting can be made very subtle to highlight even smaller structures in a pleasing look and can be easily integrated even when the available installation space is tight.

A combined ambient lighting is also provided and realized using the third housing part, with the second light conductor which is arranged in the second receiving space providing the ambient light. Light is hereby emitted via the gap between the second and third housing parts to the outside and thus into the room or surroundings. Also the ambient light is virtually "elongated", with the second light conductor extending in parallel relationship to the first light conductor, and also with the gap extending in parallel relationship to the light exit line. Overall, the combined lighting device is of compact design and suitable for producing a contour illumination as well as an ambient illumination.

According to another advantageous feature of the present invention, the film strip may have a thickness of less than 1 mm. Currently preferred is a thickness of the film strip between 0.3-0.5 mm. The use of such a thin film strip results in light strips that have a very small width of substantially below 1 mm, when compared to conventional contour lightings that have a light strip width of 2 mm or more.

According to another advantageous feature of the present invention, the film strip may be made of polymethyl methacrylate (PMMA). Such a film strip is sufficiently transparent.

According to another advantageous feature of the present invention, the film strip may be dyed. In this way, there is the option to emit a colored contour illumination. Thus, generation of a red, yellow or green contour illumination line becomes possible even though white light is projected into the light conductor as initial light.

According to another advantageous feature of the present invention, the first and second housing parts may have terminal support surfaces, with the film strip being received between the support surfaces. In this way, the film strip can be securely fixed and integrated in the housing. The support surfaces provide a sufficiently large area for establishing a secure and firm fixation of the film strip. Advantageously, the support surfaces adjoin the receiving space. As a result, the film strip can be placed in immediate proximity to the first light conductor.

According to another advantageous feature of the present invention, the film strip can be clamped or bonded between the edges of the first and second housing parts. Advantageously, the film strip is clamped or bonded between the support surfaces. This secures the film strip between the edges. Clamping of the film strip may be realized by using suitable connections, such as snap or clamping mechanisms.

According to another advantageous feature of the present invention, the first and second receiving spaces have each a round cross section, with the first receiving space being formed by a half-round depression in the first housing part and a half-round depression in the second housing part, and the second receiving space being formed by a half-round depression in the second housing part and a half-round depression in the third housing part.

According to another advantageous feature of the present invention, the first and second receiving spaces may each have at least one area which can be painted or coated through vapor-depositing, advantageously with aluminum, to form a mirror surface.

The marginal region of the housing where the strip with its light exit end face is arranged can be configured in a narrowest possible way by making the marginal region as small as possible through inwardly recessing one or more housing parts. In this way, the marginal region of the housing can be designed extremely narrow, especially when all housing parts are inwardly recessed. As a result, the marginal region has an overall thickness in the range of few millimeters so that the housing remains inconspicuous even when integrated in the object whose contour should be highlighted.

According to another advantageous feature of the present invention, a diffuser disk may be arranged in the gap. As a result, ambient light can be dispersed over a wide range into the room. Advantageously, the diffuser disk is clamped or bonded between the third housing part and the second housing part. The diffuser disk may also be dyed so as to produce a colored ambient light, when white light is projected into the second light conductor.

According to another advantageous feature of the present invention, the housing defines a longitudinal axis, with the second receiving space being arranged inwardly of the first receiving space in a direction of the longitudinal axis.

According to another advantageous feature of the present invention, the housing has an end face which on both sides of the film strip and/or the diffuser disk can be metallized or painted or structured. The end face of the housing edge, i.e. the location where the film strip terminates flush with the housing, is normally also visible when installed. By coating, painting and/or providing structure, e.g. grain pattern or the like, this region can be provided with a particular look which is visible even when the contour lighting is inactive. For example, a circumferential metallic look can be realized which is visible and in which the light strip may optionally be produced.

According to another aspect of the present invention, a motor vehicle includes a lighting device which has a housing having first and second housing parts to define a first receiving space there between, and a third housing part arranged on the second housing parts such as to define an open gap, the third housing part defining with the second housing part a second receiving space, a first light conductor arranged in the first receiving space, a plastic film strip arranged between edges of the first and second housing parts and being transparent for light emitted by the first light conductor, with the emitted light being projected into one end face of the film strip and extracted from another end face of the film strip, the film strip being sized to terminate flush with the first and second housing parts, and a second light conductor arranged in the second receiving space emitting light through the gap.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
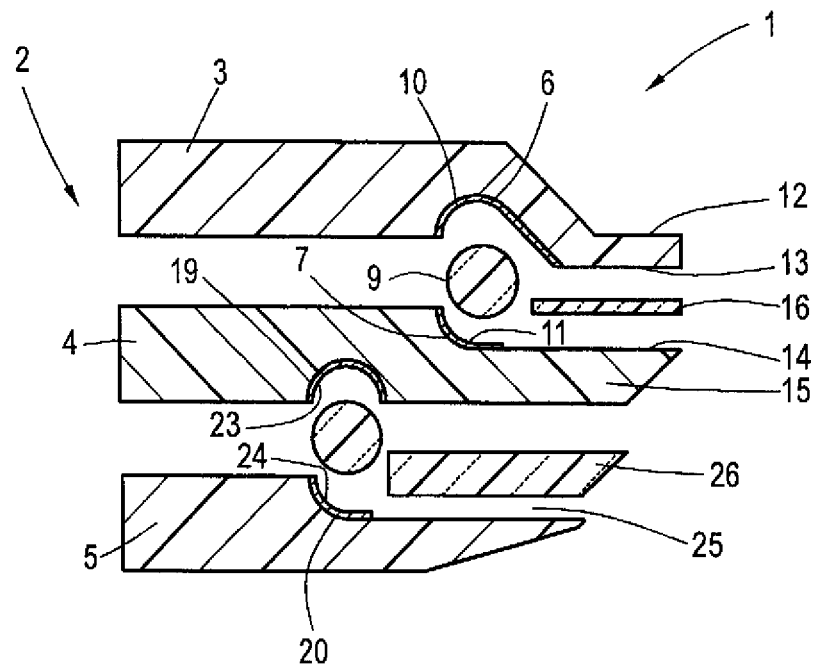
FIG. 1 is a schematic, exploded sectional view of a lighting device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic, exploded sectional view of a lighting device according to the present invention, generally designated by reference numeral 1. The lighting device 1 includes a housing 2 comprised of first, second, and third housing parts 3, 4, 5 which are made advantageously of plastic. It will be understood that the geometry of the three housing parts 3, 4, 5 is shown by way of example only and may, of course, assume any shape and have any suitable cross sectional form, especially with respect to the housing portion on the left-hand side of the drawing. The housing 2 has an elongate configuration and can be shaped to best suit the contour to be highlighted. Fasteners may optionally be placed on the housing 2 to allow proper installation.

Figure 2:
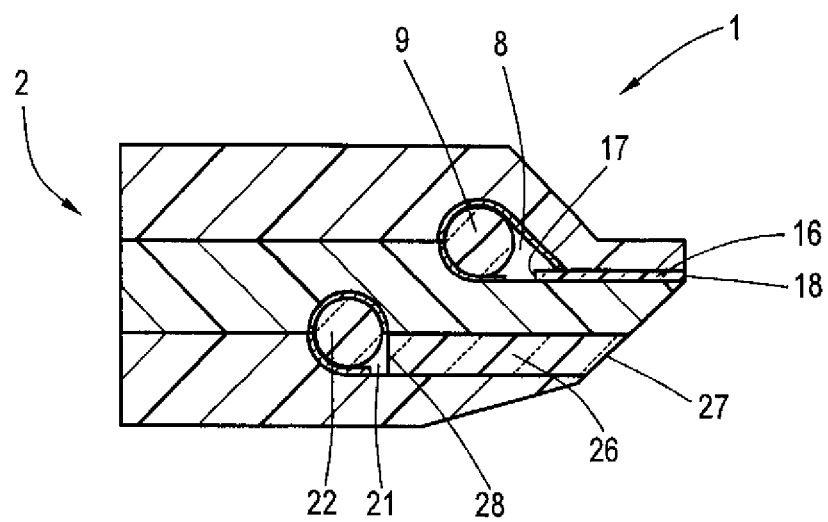
FIG. 2 is a sectional view of the lighting device of FIG. 1 in assembled state.

The first and second housing parts 3, 4 have each a round depression 6, 7 to define a receiving space 8 for receiving a first light conductor 9, when the housing parts 3, 4 are joined together. The assembled state of the housing 2 is shown in FIG. 2. The inner surfaces of the depressions 6, 7 may be provided for example with a coating 10, 11, e.g. an aluminum coating, to form a mirror surface, as indicated in FIG. 2.

The first housing part 3 is inwardly recessed towards its marginal region 12 so that the marginal region 12 becomes very narrow and has a support surface 13. Facing the support surface 13 is a support surface 14 of a marginal region of the second housing part 4 so that the support surfaces 13, 14 extend in parallel relationship when assembled. A very thin strip 16 of plastic film, e.g. a PMMA (polymethyl methacrylate) film, is placed between the support surfaces 13, 14 and is transparent so as to allow conduction of light that is emitted by the light conductor 9. The film strip 16 has a thickness of, for example, less than 1 mm. Currently preferred is a thickness of the film strip 16 between 0.3 and 0.5 mm.

When assembled, the plastic film strip 16 is positioned adjacent to the receiving space 8 and thus adjacent to the light conductor 9 so that light from the light conductor 9 is emitted to the side, projected into the end face 17 of the film strip 16 and extracted on the opposite side 18. As the film strip 16 is very thin, a very narrow light strip can thus be realized as contour lighting. As shown by way of example, the film strip 16 is sized to extend into a free space of the receiving space 8 at a slight distance next to the light conductor 9.

Provided on the underside of the second housing part 4 is a further round depression 19 which is faced by a round depression 20 formed in the housing part 5 to thereby define a second receiving space 21 for a second light conductor 22, as shown in FIG. 2. Both depressions 19, 20 may also be provided with a coating 23, 24, respectively, to form a mirror surface.

When assembled, the second and third housing parts 4, 5 define a gap 25 in which a diffuser disk 26 is placed. The diffuser disk 26 can also be made of transparent material and has a free end face 27 which is distal to the light conductor 22 and has a slanted configuration to enlarge the exit surface and thus the light refraction area. The diffuser disk 26 is instrumental to produce an ambient lighting. Light projected into the light conductor 22 is emitted by the light conductor 22 to the side into the receiving space 21 where it is projected into the end face 28 of the diffuser disk 26. Light is extracted at the opposite end face 27 of the diffuser disk 26 and illuminates the room via the beveled light refraction area.

FIG. 2 shows the basic configuration of the assembled housing 2. The lighting device 1 thus has a three-part housing 2 with two receiving spaces 8, 21 for accommodating two light conductors 9, 22. The cross sectional shape of the receiving spaces 8, 21 substantially corresponds to the round light conductor shape. Light can be projected separately into each of the light conductors 9, 22. This is realized by a light source by which white light is projected into a conductor end face. Light running in the light conductor 9, 22 is extracted over the entire length also to the side and projected either into the film strip 16 or the diffuser disk 26 from where light exits at the exit end faces 18 and 27, respectively. The plastic film strip 16 provides hereby the contour lighting while the diffuser disk 26 which is much thicker than the plastic film 26 provides the ambient lighting. For example, the diffuser disk 26 may have a thickness of 2 mm or more. Both the film strip 16 and the diffuser disk 26 may, optionally, be dyed to produce a colored contour illumination or ambient illumination. The invention thus provides for a common lighting device 1 for contour lighting and ambient lighting.

Both the film strip 16 and the diffuser disk 26 may be clamped by a basic mounting bracket between the housing parts 3, 4 and 4, 5, respectively. It is, of course, also conceivable to bond the film strip 16 and the diffuser disk 26 to the respective housing parts. This is easy to implement because the support surfaces of the housing parts 3, 4, 5 are flat. Both the film strip 16 and the diffuser disk 26 are flush-mounted with the end face of the housing 2 so as to provide a substantially closed surface.

The surfaces of the housing parts 3, 4, 5 in proximity to the exit end faces 18, 27 of the film strip 16 and diffuser disk 26, respectively, can be provided with a coating, for example a metallic coating, or with a structure such as a grain pattern or the like, so as to impart the actual visible side of the housing 2 with a particular look, when installed. However, this is not necessarily required.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A lighting device, comprising:
   a housing having first and second housing parts to define a first receiving space there between, and a third housing part arranged on the second housing part such as to define an open gap, said third housing part defining with the second housing part a second receiving space;
   a first light conductor arranged in the first receiving space;
   a plastic film strip arranged between edges of the first and second housing parts and being transparent for light emitted by the first light conductor, with the emitted light being projected into one end face of the film strip and extracted from another end face of the film strip, said film strip being sized to terminate flush with the first and second housing parts; and
   a second light conductor arranged in the second receiving space and emitting light through the gap.

2. The lighting device of claim 1, configured in the form of a combined contour and ambient lighting for a motor vehicle.

3. The lighting device of claim 1, wherein the film strip has a thickness of less than 1 mm.

4. The lighting device of claim 1, wherein the film strip has a thickness between 0.3-0.5 mm.

5. The lighting device of claim 1, wherein the film strip is made of polymethyl methacrylate (PMMA).

6. The lighting device of claim 1, wherein the film strip is dyed.

7. The lighting device of claim 1, wherein the first and second housing parts have terminal support surfaces, said film strip being received between the support surfaces.

8. The lighting device of claim 7, wherein the first receiving space adjoins the support surfaces.

9. The lighting device of claim 1, wherein the film strip is clamped or bonded between the edges of the first and second housing parts.

10. The lighting device of claim 7, wherein the film strip is clamped or bonded between the support surfaces of the first and second housing parts.

11. The lighting device of claim 1, wherein the first and second receiving spaces have each a round cross section, with the first receiving space being formed by a half-round depression in the first housing part and a half-round depression in the second housing part, and with the second receiving space being formed by a half-round depression in the second housing part and a half-round depression in the third housing part.

12. The lighting device of claim 1, wherein the first and second receiving spaces have each at least one region which is painted or coated through vapor-depositing to form a mirror surface.

13. The lighting device of claim 12, wherein the at least one region of each of the first and second receiving spaces is aluminized.

14. The lighting device of claim 1, wherein at least one of the first, second and third housing parts has a marginal region which is inwardly recessed.

15. The lighting device of claim 1, further comprising a diffuser disk arranged in the gap.

16. The lighting device of claim 15, wherein the diffuser disk is clamped or bonded between the third housing part and the second housing part.

17. The lighting device of claim 15, wherein the diffuser disk is dyed.

18. The lighting device of claim 1, wherein the housing defines a longitudinal axis, said second receiving space being arranged inwardly of the first receiving space in a direction of the longitudinal axis.

19. The lighting device of claim 15, wherein the housing has an end face which on both sides of at least one of the film strip and the diffuser disk is metallized or painted or structured.

20. A motor vehicle, comprising a lighting device including a housing having first and second housing parts to define a first receiving space there between, and a third housing part arranged on the second housing part such as to define an open gap, the third housing part defining with the second housing part a second receiving space, a first light conductor arranged in the first receiving space, a plastic film strip arranged between edges of the first and second housing parts and being transparent for light emitted by the first light conductor, with the emitted light being projected into one end face of the film strip and extracted from another end face of the film strip, said film strip being sized to terminate flush with the first and second housing parts, and a second light conductor arranged in the second receiving space emitting light through the gap, and a diffuser disk arranged in the gap.

* * * * *